Nov. 13, 1962 E. T. ROBERTS, JR., ETAL 3,063,467
VALVE SEATS
Original Filed May 19, 1954 3 Sheets-Sheet 3
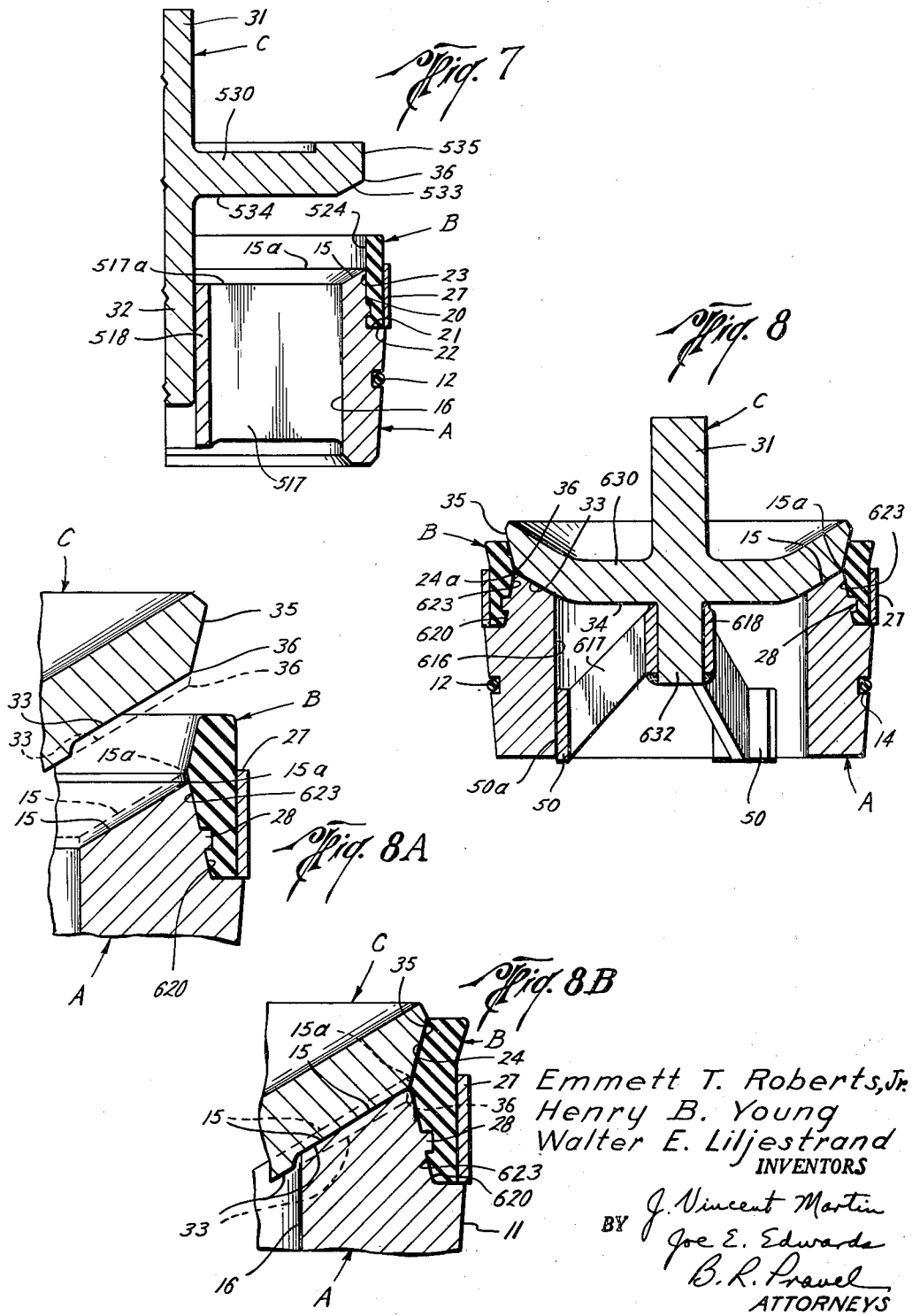
Emmett T. Roberts, Jr.
Henry B. Young
Walter E. Liljestrand
INVENTORS United States Patent Office 3,063,467
Patented Nov. 13, 1962

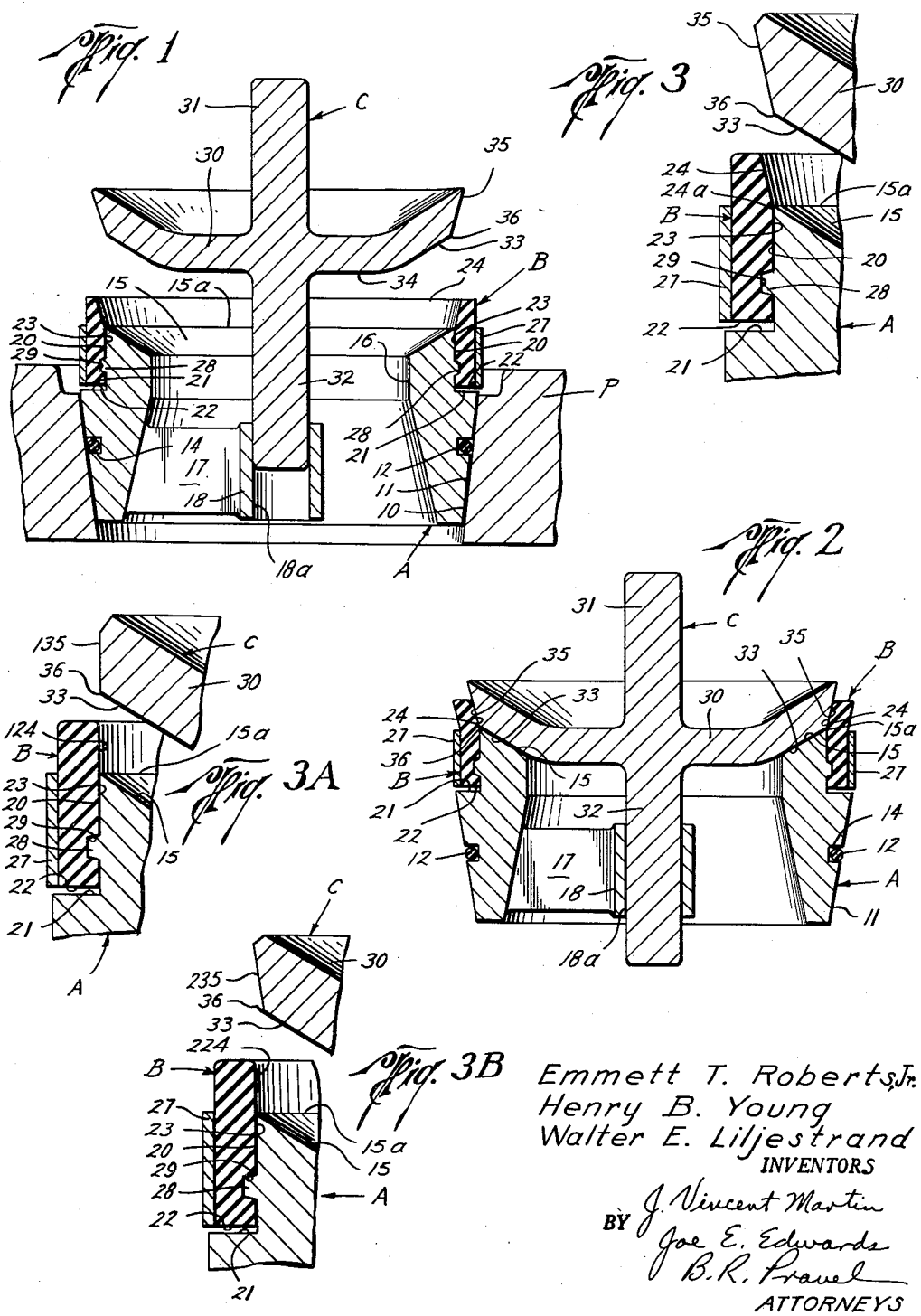

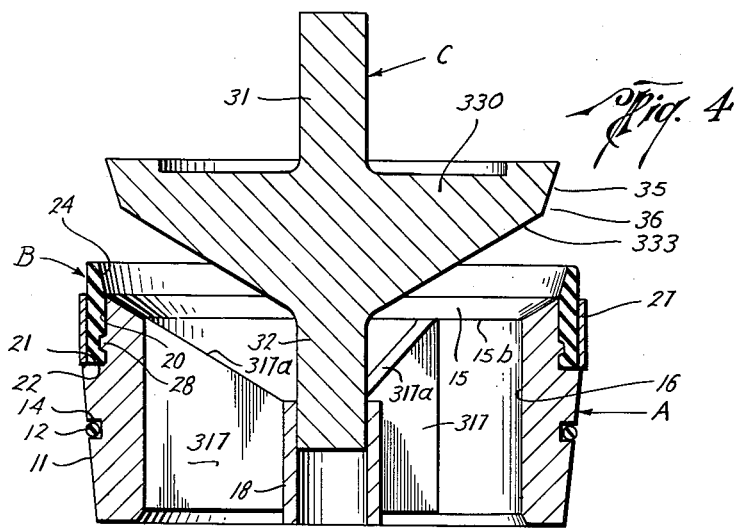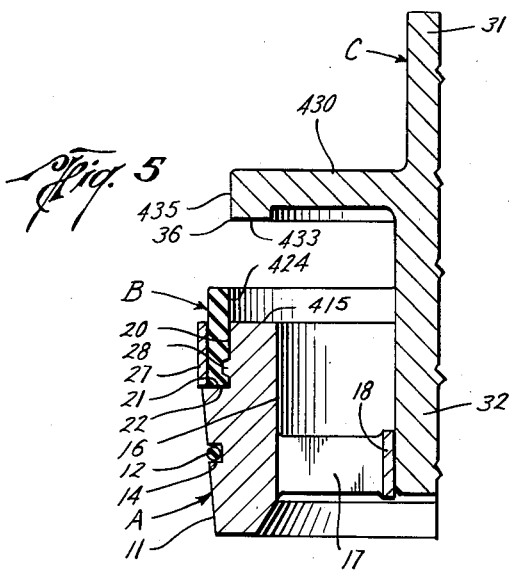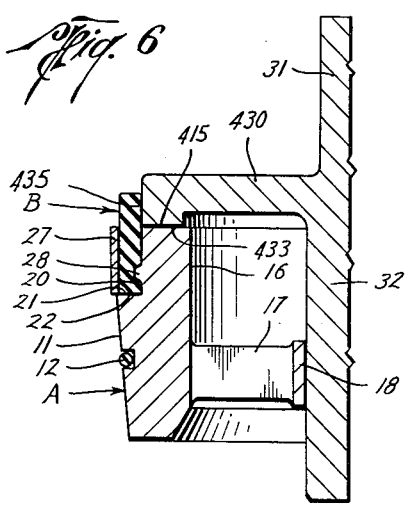

3,063,467
VALVE SEATS
Emmett T. Roberts, Jr., and Walter E. Liljestrand, Houston, Tex., and Henry B. Young, New York, N.Y., assignors to Mission Manufacturing Company, Houston, Tex., a corporation of Texas
Continuation of application Ser. No. 430,832, May 19, 1954. This application Apr. 8, 1960, Ser. No. 20,992
19 Claims. (Cl. 137—516.29)

This invention relates to new and useful improvements in valves, and is a continuation of our co-pending application Serial No. 430,832 filed May 19, 1954 now abandoned.

An object of this invention is to provide a new and improved valve, and particularly a new and improved valve for use in pumps such as mud pumps, wherein said valve has a valve member which has a seating surface adapted to contact a valve seat to close said valve, and a sealing surface adapted to slidably engage a flexible or elastic seal ring to form a seal therewith to prevent leakage through the valve when said valve is closed by the contact of said seating surface with said valve seat.

An important object of this invention is to provide a new and improved valve which includes an annular valve seat member having an annular metallic valve seat and an elastic sealing sleeve secured thereto and extending above the valve seat, and a valve member having an annular metallic seating surface engageable with said valve seat to close said valve and also having an annular sealing surface adapted to engage said sealing sleeve with a sliding sealing contact as said valve member moves toward a closed position, whereby a fluid seal is obtained during the closing of said valve.

Another object of this invention is to provide a new and improved valve which includes an elastic sealing ring mounted on a valve seat member, and a valve member longitudinally movable with respect to said sealing ring and having a sealing surface adapted to enter the bore of said sealing ring and to engage therewith to form a fluid seal as said valve member moves to a closed position on said valve seat member.

Still another object of this invention is to provide in a new and improved valve which includes an elastic sealing ring mounted on a valve seat member, a valve member longitudinally movable with respect to said sealing ring and having a sealing surface adapted to enter the bore of said sealing ring and to engage therewith to form a fluid seal as said valve member moves to a closed position, the sealing surface being inclined more with respect to the axis of the valve member than the bore of said ring, whereby said ring is placed under lateral compression when said sealing surface moves into the bore of the ring to increase the sealing action between the ring and the sealing surface.

A further object of this invention is to provide in a new and improved valve having an annular elastic sealing element mounted on a valve seat member, a valve member having a sealing surface adapted to enter the bore of said sealing element and to engage therewith in sealing contact, said valve member and said valve body having co-acting seating surfaces which are inclined with respect to the axis of said valve body and said valve member, and said valve body being so constructed that the peripheries of said seating surfaces maintain a constant relationship to each other even though said seating surfaces wear during use, whereby proper closing of the valve is maintained and also the sealing contact between said sealing element and said sealing surface is maintained even after wear of the seating surfaces.

The construction designed to carry out the invention will be hereinafter described, together with other features thereof.

The invention will be more readily understood from a reading of the following specification and by reference to the accompanying drawings forming a part thereof, wherein an example of the invention is shown, and wherein:

FIGURE 1 is a vertical setcional view illustrating one form of the valve of this invention in an open position.

FIGURE 2 is a view similar to FIGURE 1, but illustrating the valve of this invention in a closed position.

FIGURE 3 is a detailed vertical sectional view of a portion of the valve illustrated in FIGURE 1.

FIGURE 3A is a view similar to FIGURE 3, but illustrating a modification of the valve shown in FIGURES 1–3.

FIGURE 3B is a view similar to FIGURE 3, but illustrating another modification of the valve shown in FIGURES 1–3.

FIGURE 4 is a vertical sectional view of still another modification of the valve illustrated in FIGURE 1.

FIGURE 5 is a half-sectional view of a modified valve of this invention in the open position.

FIGURE 6 is a view similar to FIGURE 5, but illustrating the valve shown in FIGURE 5 in a closed position.

FIGURE 7 is a half-sectional view of another modified valve of this invention.

FIGURE 8 is a vertical sectional view illustrating a modified valve of this invention.

FIGURE 8A is a detailed sectional view illustrating a portion of the valve illustrated in FIGURE 8 when said valve is in an open position, and illustrating in particular the seating surfaces of the valve after wear thereof has occurred.

FIGURE 8B is a view similar to FIGURE 8A, but illustrating the valve in a closed position after wear of the seating surfaces of the valve has occurred.

In the drawings, the letter P designates the portion of a pump body in which the valve of this invention is adapted to be mounted and used. The valve of this invention broadly includes an annular seat member A, which has mounted thereon a sealing sleeve or ring B of resilient or elastic material such as rubber, plastic or the like. A valve member or valve body member C is mounted for longitudinal movement with respect to the seat member A and the sealing sleeve or ring B to effect an opening and a closing of the valve. When the valve is in an open position (FIGURE 1) fluid may flow through the bore of the valve seat member A, but, when the valve is in a closed or seated position (FIGURE 2), fluid flow through the bore of the seat member A is prevented. As will appear hereinafter, each of the various forms of the valve of this invention provides for a closing of the valve upon a contact of metallic seating surfaces on the valve seat member A and the valve body member C and also provides for a sliding sealing engagement of a sealing surface on the valve body member C with the bore of the sealing sleeve or ring B as the valve moves to a closed position and after the valve has reached its closed position, whereby an improved operation and longer periods of service can be obtained from the valve of this invention as compared to prior known valves.

In FIGURES 1–3, one form of the valve of this invention is shown, wherein the valve seat member A is mounted in the bore 10 of the pump body P with a frictional fit or by any suitable securing means, with the bore 10 being tapered or inclined downwardly and inwardly and the external surface 11 of the valve seat A being similarly tapered or inclined downwardly and inwardly to fit firmly within the bore 10. An O-ring 12 of rubber or similar material may be positioned in an annular groove 14 in the external surface 11 of the valve seat A to provide a fluid seal between the bore surface 10 and the external surface 11 of the valve seat A, but in many instances the O-ring 12 and groove 14 can be omitted. Within the bore 16 of the valve seat member A there is located one or more laterally extending ribs 17 which attach to and support a longitudinally extending cylindrical bushing or guide 18, which serves to guide the longitudinal movement of the valve body or valve member C from an open position to a closed position and vice versa, as will be more fully explained hereinafter.

An annular valve seat 15 is formed on the upper end of the valve seat member A, and on the upper external surface of the valve seat member A an annular recess 20 is provided so as to form an annular lateral shoulder 21. The elastic sealing ring B surrounds the valve seat member A and fits into the recess 20 with the lower end 22 of the ring B positioned above the annular lateral shoulder 21 and the lower inner wall or bore 23 of the ring B in contact with the longitudinal surface of the recess 20. The ring B extends above the upper edge of the valve seat A and a sealing surface is provided by the upper wall or bore 24 of the ring B. The outer peripheral edge 15a of the valve seat or seating surface 15 is in the same lateral plane as the annular corner or intersection 24a of the lower wall 23 and the upper wall or sealing surface 24. The ring B may be held on the valve seat member A by various means, but, as shown in the drawings, it is held in position by a retaining band 27 of metal, plastic or other suitable material which surrounds the ring B and has its upper end in substantially the same lateral plane as the upper peripheral edge 15a of the valve seat 15. Thus, the retaining band 27 does not interfere with the flexibility of the upper portion of the ring B above the valve seat 15. To further secure the ring B in position on the valve seat member A, an annular projection 28 may be provided on the longitudinal surface of the annular recess 20, which projection 28 fits into a corresponding annular groove 29 in the inner lower wall 23. It is of course obvious that the annular projection 28 and the annular groove 29 could be reversed so that the groove would be formed in the seat member A and the projection on the ring B, and the same securing function of the ring B on the seat member A would be obtained. Also, the lower end 22 of the ring B could seat on the lateral shoulder 21, if desired, as shown in FIGURE 4.

The valve body or valve member C has a body portion 30 with an upwardly extending axial stem 31 and a downwardly extending axial stem 32. A coil spring or other resilient means (not shown) may surround the upper stem 31 to urge the valve member C to its closed position in the usual manner. The lower steam 32 extends into the bore 18a of the guide bushing 18, whereby the longitudinal or axial movement of the valve member C is guided by the bushing 18.

The body portion 30 of the valve member C has a lateral lower surface 34 and an annular seating surface 33 outwardly therefrom and merging therewith, which is annular and extends downwarlly and inwardly at the same, or substantially the same, angle of inclination as the valve seat or seating surface 15 on the valve seat member A. Thus, when the valve member C is in the closed position (FIGURE 2), the seating surface 33 on the valve member C is in full contact with the valve seat 15 of the valve seat member A. The body portion 30 also has an annular seating surface 35, which has a steep angle of inclination, but which is also inclined or tapered downwardly and inwardly. The intersection of the seating surface 33 and the sealing surface 35 forms an annular corner or edge 36, which coincides with the peripheral edge 15a of the valve seat 15 when the valve member C is in its closed position (FIGURE 2).

Because of the relatively steep angle of inclination of the sealing surface 35 as compared to the seating surface 33 and the corresponding relatively steep angle of inclination of the upper wall 24 as compared to the valve seat 15, during the closing movement of the valve member C the sealing surface 35 actually moves into sliding sealing engagement with the wall or bore 24 of the seal ring B prior to the closing of the valve by the seating of the seating surface 33 on the valve seat 15, whereby very little wear of the upper wall 24 of the seal ring B occurs even after extended periods of used. The seal between the sealing surface 35 and the bore 24 of the seal ring B, of course, continues after the valve is closed by the contact of the seating surface 33 with the valve seat 15.

In the form of the invention shown in FIGURES 1–3, the angle of inclination of the sealing surface 35 with respect to the axis of the valve member C is preferably slightly greater than the angle of inclination of the upper wall or bore 24 of the seal ring B. For example, as shown in the drawings, the angle of inclination of the sealing surface 35 is 15° with respect to vertical or the axis of the valve member C, while the angle of inclination of the upper wall or bore 24 is 10° with respect to vertical or the axis of the valve member C. With the sealing surface 35 of the valve member C having a slightly greater angle of inclination than the upper bore or wall 24 of the seal ring B, there is a slight outward radial movement of the upper flexible portion of the seal ring B. Such outward radial movement or distortion results in a lateral compression of the seal ring B to provide a tighter seal than results when the angle of inclination of the sealing surface 35 and the bore 24 are the same.

In the operation of the form of valve illustrated in FIGURES 1–3, the valve member C is moved to an open position (FIGURE 1) when the differential fluid pressure acting on the valve reaches a predetermined amount. When such differential fluid pressure falls below the predetermined amount, the valve member C is then urged downwardly toward its closed position. As the sealing surface 35 of the valve member C enters the bore 24 of the seal ring B, the sealing surface 35 on the valve member C slidably engages the upper wall or bore 24 of the seal ring B in sealing contact and effects an initial closure of the valve, as the valve member C moves toward its closed position. The downward movement of the valve member C is stopped by the contact of the seating surface 33 of the valve member C with the valve seat 15 of the valve seat member A, whereupon the valve is closed and a fluid seal is provided by the engagement of the surfaces 35 and 24. Since the valve member C and the valve seat member A are generally made of metal or other similar hard material, all, or substantially all, of the closing force is absorbed by the contact of the metal surfaces 15 and 33. Because of the relatively steep angle of inclination of the sealing surface 33 and the bore or wall 24, relatively little wear occurs on these surfaces 24 and 33, but proper sealing action is obtained. With the angle of inclination of the sealing surface 35 being slightly greater with respect to the axis of the valve member C than the angle of inclination of the wall 24, a slight radial or lateral compression of the seal ring B is obtained at its upper flexible portion above the valve seat 15 to provide an improved seal, as previously mentioned.

FIGURE 3A is a similar view to FIGURE 3, but FIGURE 3A illustrates several modifications in the form of the valve illustrated in FIGURES 1–3. The valve illustrated in FIGURE 3A differs from the valve shown in FIGURES 1–3 in that the upper bore or wall 124 of the sealing sleeve B is vertical or parallel to the longitudinal axis of the valve member C instead of being inclined as in the upper bore 24 in FIGURE 1. The sealing surface 135 of the valve member C, instead of being inclined as is the sealing surface 35 in FIGURES 1–3, is vertical or parallel to the longitudinal axis of the valve member C. With this construction of FIGURE 3A, the sealing surface 135 enters the bore or wall 124 in sliding, sealing contact, but there is no lateral distortion or compression of the seal ring B as the valve member C moves toward its closed position. The rest of the valve shown in part in FIGURE 3A is identical with the form of the valve shown in FIGURES 1–3, and therefore like parts in FIGURE 3A are identified by the same numerals as used in FIGURES 1–3.

FIGURE 3B shows substantially the same portions of the valve as are illustrated in FIGURE 3, and the form shown in FIGURE 3B differs from the form of the valve in FIGURES 1–3 in that the bore or wall 224 is vertical or parallel to the longitudinal axis of the valve member C instead of being inclined as is the bore 24. Also, the sealing surface 235 has a steeper angle of inclination than the sealing surface 35 in the valve of FIGURES 1–3. For example, the sealing surface 235 has an angle of inclination of 5° with respect to vertical or the longitudinal axis of the valve member C. Thus, the angle of inclination of the bore 224 is less than the angle of inclination of the sealing surface 235, and a similar lateral compression of the seal ring B is obtained in the form of the valve shown in FIGURE 3B as obtained in connection with the form of the valve shown in FIGURES 1–3. The rest of the valve shown in part in FIGURE 3B is identical with the form of the valve shown in FIGURES 1–3, and therefore like numerals are used in FIGURE 3B and FIGURES 1–3 to indicate the identical parts.

In FIGURE 4, another modification of the form of the valve of FIGURES 1–3 is illustrated, wherein the body portion 330 of the valve member C is thicker in cross-section than the body portion 30 in FIGURES 1–3. The lower inclined seating surface 333 in FIGURE 4 has substantially the same angle of inclination as the seating surface 33 of FIGURES 1–3, but the seating surface 333 extends downwardly to the stem 32, and therefore the substantially lateral surface 34 of FIGURES 1–3 is eliminated. Also, the ribs 317 in FIGURE 4 differ from the ribs 17 shown in FIGURE 1, in that they extend upwardly above the bushing 18, so that the upper edge 317a of each of the ribs 317 extends from the inner edge 15b of the valve seat 15 to the bushing 18 at the same angle of inclination as the valve seat 15, whereby the upper edge 317a of the ribs 317 in effect forms a continuation of the valve seat 15. The rest of the structure of FIGURE 4 is identical with that shown in FIGURES 1–3, and the like numerals are used in FIGURES 1 and 4 to identify like parts.

In the operation of the form of the valve shown in FIGURE 4, all of the parts function in the same manner as the parts shown in FIGURE 1, except that there is an additional seat or stop provided by the contact of the upper edges 317a of the ribs 317 with the lower portion of the seating surface 333. Thus, in the form of the valve shown in FIGURE 4, the wear occasioned by the repeated closing of the valve is distributed over a larger area of contact.

In FIGURES 5 and 6 a further modification of the valve shown in FIGURES 1–3 is illustrated. The body portion 430 of the valve member C is modified somewhat as compared to the body portion 30 of FIGURE 1, so that the sealing surface 435 is vertical or parallel to the longitudinal axis of the valve member C, and the seating surface 433 is horizontal or perpendicular to the longitudinal axis of the valve member C. Also, the bore or upper wall 424 of the seal ring or sleeve B is vertical or parallel to the axis of the valve member C, while the valve seat 415 is horizontal or perpendicular to the axis of the valve member C. The rest of the parts of the valve of FIGURES 5 and 6 are identical with that shown in FIGURES 1–3, and like parts in FIGURES 5 and 6 and FIGURES 1–3 are identified by the same numerals.

In the operation of the valve of FIGURES 5 and 6, as the valve member C moves from its open position (FIGURE 5) to its closed position (FIGURE 6), the sealing surface 435 slidably engages the upper wall or bore 424 of the sealing ring B to provide a seal therewith, but no lateral compression or distortion of the seal ring B is effected. The valve is closed when the seating surface 433 engages the valve seat 415.

In FIGURE 7, another modification of the form of the valve shown in FIGURES 1–3 is illustrated, wherein the body portion 530 of the valve member C has a sealing surface 535, which is vertical or parallel to the longitudinal axis of the valve member C, and a seating surface 533, which is at substantially the same inclination as the seating surface 33 of FIGURE 1, but it is somewhat shorter in length. In FIGURE 7, the lower lateral surface 534 of the valve body 530 is adapted to contact the upper edge 517a of the ribs 517, which are connected between the valve seat member A and the guide bushing 518. The upper wall or bore 524 of the sealing ring B is also vertical or parallel to the axis of the valve member C. Thus, in the operation of the valve of FIGURE 7, there is a sliding sealing engagement between the sealing surface 535 and the bore 524, but there is no lateral compression or distortion of the seal ring B during the closing action. The surfaces 533 and 534 contact the upper edges 517a of the ribs 517 and the valve seat 15, respectively, at the same time to thereby distribute the force or impact of the closing of the valve over a wider area of contact than in the form of the valve shown in FIGURES 1–3. The parts which are identical in FIGURES 1 and 7 are identified by like numerals.

In FIGURES 8, 8A and 8B, another modification of the valve shown in FIGURES 1–3 is illustrated, wherein the means for guiding the valve member C during its longitudinal movement to and from open and closed positions is modified and also wherein means are provided for compensating for the wear of the seating surfaces on the valve seat member A and the valve body member C, so that even though such seating surfaces become worn, proper seating of the valve is obtained and a full seal between the sealing ring B and the valve member C is maintained. In FIGURE 8, the body portion 630 is substantially identical with the body portion 30 of FIGURE 1, except that the lower axial stem 632 is somewhat shorter in length and is welded to, or otherwise secured to, the sleeve 618. The sleeve 618 is connected to downwardly extending lateral ribs 617, each of which has a guide shoe 50 with an arcuate outer surface 50a. The curved bore or inner wall 616 of the valve seat member A is vertical or parallel to the longitudinal axis of the valve member C, and the outer surface 50a of each shoe 50 conforms to the curvature of the wall 616 so that, during the movement of the valve member C to and from the open and closed positions, the outer surfaces 50a of the guide shoes 50 contact and are guided along the bore or wall 616 of the valve seat member A to thereby guide the movement of the valve member C. This particular form of guide means illustrated in FIGURE 8 could, of course, be utilized in the valves of FIGURES 1–7 instead of the various other types of guide means shown in FIGURES 1–7.

In order to compensate for the wear of the seating surface 33 and the valve seat 15 and to maintain full sealing contact between the sealing surface 35 and the upper wall or bore 24, the longitudinal wall of the annular recess 620 is flared or inclined downwardly and outwardly at an angle with respect to the axis of the valve member C, and the lower inner wall 623 of the sealing ring B is in contact with the longitudinal wall of the recess 620. The lower inner wall 623 may be actually formed with the same inclination as the longitudinal wall of the recess 620, or the inner wall 623 may be made substantially vertical or longitudinal and then conformed to the longitudinal wall of the recess 620 by stretching the ring B into its seated position in the recess 620. Such angle of inclination of the longitudinal wall of the recess 620 is preferably equal but opposite to the angle of inclination of the sealing surface 35 of the valve member C, so that, as illustrated in FIGURE 8, the longitudinal wall of the recess 620 (and the lower inner wall 623 of the seal ring B when in position in the recess 620) would be flared back at an angle of about 15° with respect to the vertical or longitudinal axis of the valve member C. Before any wear occurs (FIGURE 8) the annular edge 36 between the sealing surface 35 and the seating surface 33 is coincident with the outer peripheral edge 15a of the valve seat 15 in the closed position. In FIGURES 8A and 8B, dotted lines indicate the annular corner 36, the seating surface 33, the valve seat 15 and the outer peripheral edge 15a thereof prior to the time that any wear occurs on such surfaces. The solid lines in FIGURES 8A and 8B which bear the same numerals as the dotted lines indicate those same parts after wear has occurred on the seating surface 33 and the valve seat 15. It is believed evident from FIGURES 8A and 8B that, as the seating surface 33 and the valve seat 15 wear, the annular edge or corner 36 on the valve member C actually becomes increasingly further displaced from the longitudinal central axis of the valve member C. With the valve member C and the valve seat member A being of substantially the same material, the seating surface 33 and the valve seat 15 will wear at substantially the same rate during use, so that with the outwardly flared longitudinal wall of the recess 620 and the similarly outwardly flared lower wall 623 of the seal ring B, the outer peripheral edge 15a also is displaced outwardly as wear occurs, with the result that the annular edge 36 and the peripheral edge 15a continue to coincide with each other, even after the seating surface 33 and the valve seat 15 have become worn. With the edge 36 and the edge 15a maintained coincident during wear of the seating surface 33 and the valve seat 15, the seating surface 33 is not prevented from fully seating on the valve seat 15 by reason of a contact of the annular edge 36 with the lower wall 623 of the sealing ring B, such as might occur if the inner wall 623 of the sealing ring B were not flared outwards as illustrated in FIGURES 8, 8A and 8B. For example, assume that the longitudinal wall of the recess 620 were vertical and the lower inner wall 623 of the seal ring B were also vertical, after wear has occurred to displace the annular edge 36 outwardly to the point shown in the solid line in FIGURE 8A, the annular edge would contact the rubber or other material of the inner wall 623 and would damage same and possibly would prevent the full seating of the seating surface 33 on the valve seat 15. Thus, with the construction shown in FIGURES 8, 8A and 8B, a greater period of use can be obtained than is obtainable in a valve wherein the inner wall 623 is not flared outwardly at substantially the same angle as the angle of inclination of the sealing surface 35. The operation of the valve of FIGURE 8 would be substantially identical with that shown in FIGURES 1-3, except for the guiding action obtained by the guide shoes 50 and the wear compensation provided by the construction of FIGURE 8.

The foregoing disclosure and description of the invention is illustrative and explanatory thereof, and various changes in the size, shape and materials, as well as in the details of the illustrated construction, may be made, within the scope of the appended claims, without departing from the spirit of the invention.

What is claimed is:

1. A valve adapted to be mounted on a pump body, comprising a valve seat member having an annular valve seat formed thereon, a seal ring attached to said valve seat member having an upper flexible portion extending above said valve seat, the bore of said upper flexible portion of said seal ring extending a relatively small acute angle downwardly and inwardly with respect to the axis of said seal ring, an axially movable valve body member adapted to move axially with respect to said valve seat member, said valve body member having an annular seating surface to contact said annular valve seat to close the valve, and said valve body member also having a sealing surface adapted to slidably engage the bore of the upper portion of said seal ring during the closing of said valve, said sealing surface engaging the ring during closing movement of the valve body member before engagement of the valve body member with the valve seat and sliding therealong during movement of the valve body member to fully closed position.

2. The structure set forth in claim 1, wherein the bore of said seal ring and said sealing surface of said valve body member are at substantially the same inclination.

3. The structure set forth in claim 1, wherein the bore of said seal ring and said sealing surface of said valve body member are at different angles of inclination to effect a lateral compression of the flexible portion of said seal ring during the closing movement of the valve body member with respect to the valve seat member.

4. The structure set forth in claim 1, wherein the bore of the seal ring and the sealing surface of the valve body member are both inclined at an acute angle with respect to the longitudinal axis of the valve body member, the bore of the seal ring being inclined less than the sealing surface of the valve body member, whereby the seal ring is laterally compressed during the closing of the valve to provide an increased sealing action therebetween.

5. A valve adapted to be mounted in a pump body, comprising a valve seat member having an annular valve seat thereon, a sealing ring attached to said valve seat member and having an upper flexible portion extending above said annular valve seat, the bore of said upper flexible portion extending substantially axially, a valve body member slidably mounted on said valve seat member and adapted to move longitudinally with respect thereto for opening and closing the valve, said valve body member having a seating surface and a sealing surface, said seating surface being adapted to contact said annular valve seat to close said valve, and said sealing surface being adapted to slidably engage the bore of said sealing ring during the closing of the valve, said seating surface and said sealing surface being at different angles of inclination with respect to each other, said sealing surface engaging the ring during closing movement of the valve body member before engagement of the valve body member with the valve seat and sliding therealong during movement of the valve body member to fully closed position.

6. A valve adapted to be opened when a differential in fluid pressure acting thereon exceeds a predetermined amount and adapted to be closed when the differential in fluid pressure falls below said predetermined amount, comprising a valve seat member, an elastic sealing ring attached to said valve seat member, the bore of a portion of said sealing ring extending at a relatively small acute angle downwardly and inwardly with respect to the axis of said ring, and a valve body member having an annular metallic sealing surface slidably engaging the elastic sealing ring in sealing contact therewith during the movement of said valve body member to a closed position on said valve seat member, said sealing surface engaging the ring during closing movement of the valve body member before engagement of the valve body member with the valve seat member and sliding therealong during movement of the valve body member to fully closed position.

7. The structure set forth in claim 6, wherein said valve seat member has an annular metallic valve seat thereon adjacent to said elastic sealing ring, and said valve body member has a seating surface formed thereon adjacent to said sealing surface, said seating surface and said sealing surface on said valve body member being formed at different angles of inclination.

8. The structure set forth in claim 6, including a guide bushing mounted on said valve seat member, and an axial downwardly extending stem on said valve body member adapted to extend through said guide bushing, whereby the axial movement of said valve body member relative to said valve seat member during movement from an open position to a closed position and vice versa is guided by said guide bushing.

9. The structure set forth in claim 6, wherein said valve seat member has a cylindrical bore, and including arcuate guide shoes secured to said valve body member and movable therewith, said guide shoes contacting said cylindrical bore of said valve seat member during axial movement of said valve body member relative to said valve seat member to thereby guide the movement of said valve body member from an open to a closed position and vice versa.

10. A valve comprising, a valve seat member with an annular valve seat formed at its upper end, an elastic sealing ring having a lower portion thereof surrounding said valve seat member and attached thereto and an upper portion extending above said valve seat member, said upper portion being unconfined and capable of displacement in a radial direction, a valve body member axially movable with respect to said valve seat member for effecting an opening and a closing of the valve, said valve body member having an annular seating surface adapted to contact said valve seat to close the valve and an annular sealing surface adapted to slidably engage the bore of the upper portion of said elastic ring during the closing of the valve, the intersection of said seating surface and said sealing surface forming an annular corner adapted to coincide with the outer peripheral annular edge of said valve seat when the valve is in the closed position.

11. The structure set forth in claim 10, wherein the bore of the upper portion of said ring and the sealing surface of said valve body member are inclined downwardly and inwardly and the external surface of the valve seat member is flared outwardly at an equal and opposite angle to the inclination of said sealing surface of the valve body member and with the bore of the lower portion of said ring being in contact with the flared external surface of the valve seat member, so that said annular corner and said peripheral edge continue to coincide with each other in the closed position, even after said valve seating surface and said valve seat have become worn.

12. A valve adapted to be mounted on a pump body, comprising a valve seat member having an annular valve seat formed on its upper portion, an annular elastic seal ring surrounding the upper portion of the member and encircling the valve seat, the seal ring having its upper portion extending upwardly above the valve seat and being unconfined whereby it is capable of a flexing movement in a direction radially of the seal ring, an axially movable valve body adapted to move axially with respect to the seat member, said body having an annular seating surface engageable with the valve seat when the valve is closed, said valve body having an annular sealing surface above its seating surface, which sealing surface is slidably engageable with the inner surface of the upper extended portion of the elastic seal ring as the valve body is moved axially, with respect to the valve seat, said sealing surface engaging the ring during closing movement of the valve body before engagement of the valve body with the valve seat and sliding therealong during movement of the valve body to fully closed position.

13. A valve as set forth in claim 12, together with a guide stem extending downwardly from the valve body, and a guide spider within the valve seat member having the stem movable through its central portion, the upper surfaces of the guide spider forming a continuation of the valve seat and being engageable by the seating surface of the valve body when the valve body is in fully seated position.

14. A valve adapted to be mounted in a pump body, comprising a valve seat member having an annular valve seat thereon, a sealing ring attached to said valve seat member and having an upper flexible portion extending above said annular valve seat, the bore of said upper flexible portion extending substantially axially, a valve body member slidably mounted on said valve seat member and adapted to move longitudinally with respect thereto for opening and closing the valve, said valve body member having a seating surface and a sealing surface, said seating surface being adapted to contact said annular valve seat to close said valve, and said sealing surface being adapted to slidably engage the bore of said sealing ring during the closing of the valve, the sealing surface of the valve body member extending in a direction which is substantially parallel to the axis of the member, said sealing surface engaging the ring during closing movement of the valve body member before engagement of the valve body member with the valve seat and sliding therealong during movement of the valve body member to fully closed position.

15. A valve adapted to be mounted in a pump body, comprising a valve seat member having an annular valve seat thereon, a sealing ring attached to said valve seat member and having an upper flexible portion extending above said annular valve seat, the bore of said upper flexible portion extending substantially axially, a valve body member slidably mounted on said valve seat member and adapted to move longitudinally with respect thereto for opening and closing the valve, said valve body member having a seating surface and a sealing surface, said seating surface being adapted to contact said annular valve seat to close said valve, and said sealing surface being adapted to slidably engage the bore of said sealing ring during the closing of the valve, said sealing surface of the valve body member extending at a relatively steep angle downwardly and inwardly with respect to the axis of said body, said sealing surface engaging the ring during closing movement of the valve body member before engagement of the valve body member with the valve seat and sliding therealong during movement of the valve body member to fully closed position.

16. A valve adapted to be mounted on a pump body comprising, a valve seat member having an annular endwise abutment surface formed thereon, a valve body member having an annular endwise abutment surface to contact said surface on the valve seat member and close the valve, a flexible seal ring mounted on the outer periphery of one of the valve body member and valve seat member and extending beyond the abutment surface thereon and slidably engaging the outer periphery of the other of said valve body member and valve seat member during closing of the valve to form a seal therewith, said outer periphery of the other of said valve body member and valve seat member providing a sealing surface, said sealing surface engaging the ring during closing movement of the valve body member before engagement of the valve body member with the abutment surface on the valve seat member and sliding therealong during movement of the valve body member to fully closed position.

17. A valve adapted to be mounted on a pump body comprising, a valve seat member having an annular valve seat formed thereon, an annular recess in the external surface of said valve seat member, a seal ring attached to said valve seat member and having its lower portion surrounding and fitting within said annular recess, the upper portion of said ring extending above said valve seat, an axially movable valve body member adapted to move axially with respect to said valve seat member, said valve body member having an annular seating surface to contact said annular valve seat to close the valve, said valve body member also having a sealing surface adapted to slidably engage the bore of the upper portion of said seal ring during closing of said valve, the bore of the upper portion of said seal ring and the seal surface of said valve body member being inclined downwardly and inwardly, and the bore of the lower portion of the seal ring and the longitudinal surface of said annular recess being flared outwardly to provide full seating of the seal surface of the valve body member on the valve seat after the seating surface and the valve seat become worn.

18. A valve comprising, a valve seat member with an annular seating surface formed at its upper end, a valve body member axially movable with respect to said valve seat member for effecting an opening and a closing of the valve, said valve body member having an annular seating surface adapted to contact said valve seat surface to close the valve, an elastic sealing ring secured to one of said valve body member and said valve seat member, said sealing ring surrounding the seating surface on said one member and having a portion extending beyond said one member toward the other member, said portion of the sealing ring being unconfined and capable of displacement in a radial direction, the other of said two members having an annular sealing surface adapted to slidably engage the bore of said portion of the sealing ring during closing of the valve, the intersection of the bore of said ring and the seating surface of said one member forming an annular corner adapted to coincide with the outer peripheral annular edge of the seating surface on said other member when the valve is in closed position.

19. The valve of claim 18 wherein the bore of said portion of said ring and said annular sealing surface extend away from said corner in one direction and the bore of the remainder of said sealing ring and the outer peripheral surface of said one member which the seal ring surrounds extending away from said corner in the opposite direction, each of said annular sealing surface, outer periphery of said one member, bore of said portion of the ring and bore of the reminder of the ring extending at the same angle relative to the central axis of said annular seating surface so that said annular corner and said peripheral edge continue to coincide with each other in the closed position even after said valve seating surface and said valve seat have become worn.

References Cited in the file of this patent

UNITED STATES PATENTS

| | | |
|---|---|---|
| 1,781,224 | Gilg | Nov. 11, 1930 |
| 2,148,850 | Deakins | Feb. 28, 1939 |
| 2,645,449 | Gulick | July 14, 1953 |
| 2,676,781 | Hobbs | Apr. 27, 1954 |
| 2,771,091 | Baker et al. | Nov. 20, 1956 |